Feb. 2, 1960     H. A. HARRY     2,923,386
SEALING STRIP FOR OVERLAPPED CORRUGATED PANELS
Filed June 4, 1956

INVENTOR.
H. A. HARRY
BY
ATTORNEY

United States Patent Office 2,923,386
Patented Feb. 2, 1960

2,923,386

SEALING STRIP FOR OVERLAPPED CORRUGATED PANELS

Henry A. Harry, Moline, Ill.

Application June 4, 1956, Serial No. 589,291

4 Claims. (Cl. 189—36)

This invention relates to corrugated panel structures or assemblies and more particularly to a sealing strip for joints effected by overlapping or nested corrugations that occur when panels are assembled in several sections to achieve a length in multiples of a section.

Panels of the character referred to are used extensively as walls, roofs, partitions, etc. both indoors and outdoors and in the latter instance sealing against the weather is of extreme importance. Normally, and heretofore, sealing was accomplished by the use of caulking, mastic or other additives applied in bulk form, but experience has shown that such sealing methods are defective and uneconomical for many reasons, primarily because the seal is not completely effective, is time and labor consuming in its application and must be periodically renewed and maintained because of weathering, drying out and failure due to shifting of the assembled panels. According to the present invention, these defects are overcome by the provision of a novel seal in the form of a prefabricated strip or ribbon interposable between the nested or overlapping corrugations of adjacent panels and operative to afford a perfect seal at low cost and involving but little labor in addition to that required to install the panels alone. Thus caulking is eliminated, with its attendant mess and nuisance. The invention has for a significant object the provision of a strip or ribbon comprising an elongated body made up of a pair of preferably parallel edge elements joined by a central ribbon-like web, the web being relatively thin and interposable between and conforming to the nested corrugations and the edge elements being relatively thicker and lying downhill of and at opposite sides of the peak of a corrugation. The thinness of the web does not appreciably increase the thickness of the assembly in the zone of the nested corrugations and the heavy stock of the elements renders the elements capable of accommodating irregularities on the surfaces of the panels, each element being of resilient distortable material capable of deformation when compressive pressure is applied to the panels at the zone of the seal. It is a further object in this respect that the yieldability of the elements is improved by making them tubular. These elements also preferably are of cylindrical section, enabling them to have limited uphill or downhill rolling movement on the slopes of the nested corrugations. The novel strip features a one-piece molded construction of elastomer or equivalent material such as a suitable plastic; for example, vinyl. The web features the provision of non-skid surfaces to retain it in place during assembly.

The foregoing and other important features and desirable objects inherent in and encompassed by the invention will become apparent as a preferred embodiment is disclosed by way of example in the ensuing specification and accompanying sheet of drawings, the figures of which are described immediately below.

Figure 1:
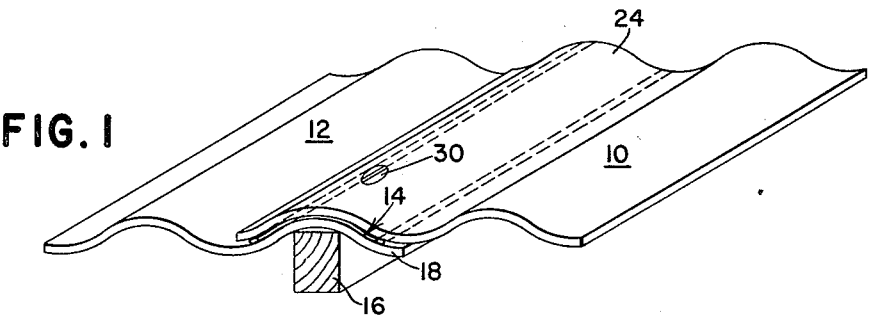
Figure 1 is a fragmentary perspective of a typical installation.

In the typical installation disclosed, the panels, as at 10 and 12, are disposed horizontally, as is the improved seal strip, which is designated as a whole at 14, as well as a representative frame member or support 16, but it will be clear that these geographical terms, used here as well as in the claim, are used for convenience only and not by way of limitation. Likewise, the particular shape and pitch of the corrugations are only illustrative. As already suggested, the panels may be of asbestos composition, commonly known as "Transite," glass, glass fiber composition, sheet metal, plastic or any other material. In any case, manufacturing processes, conducted in the interests of mass production and economy, do not produce precision results in either surface characteristics or dimensionally as respects the pitch or distance between corrugations, and the panel surfaces are often rough, pitted, etc. and dimensional accuracy is seldom achieved.

It is also well known that in the case of corrugated plastic and metal panels, the longitudinal marginal corrugations are subject to considerable distortion due to stacking and handling. Thereafter, during erection the overlapped marginal corrugations of panels of the same commercial size, when nested with the peaks of the corrugations in contact, often have the downhill portions of the corrugations variably spaced along the length thereof. Likewise in the case of metal panels, the relative hardness and thickness of the metal causes the corrugations to "spring" or "spread" after rolling and the degree of "spring" will vary from panel to panel. These conditions all increase the difficulty of obtaining moisture and airtight seals between the overlapped panel corrugations by prior art methods.

Conventionally, the panel 12 is laid on the support 16, or its equivalent, with one corrugation, as at 18, presenting a peak 20 which is received by or nested in the valley 22 of an overlapping corrugation 24 of the panel 10, the strip 14, which is elongated or ribbon-like, being interposed between and running lengthwise of the nested corrugations. The strip has a main body including a pair of preferably parallel edge elements 26 running lengthwise of the body and spaced transversely apart and interconnected by a central web 28. Screws, one which appears at 30, represent a typical fastening means. Nails are also conventional, but the specific type of fastener is immaterial, it being significant only that some means is used to apply a compressive or squeezing force to the panels in the zone of the nested peak 20 and valley 22 as an incident to the securing of the panels to the support 16.

Figure 2:
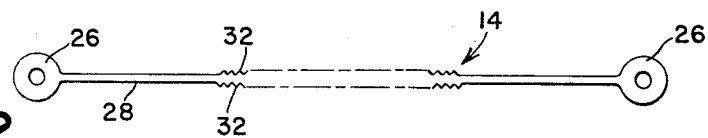
Figure 2 is an enlarged end elevation of the strip prior to deformation in use.
Figure 3:
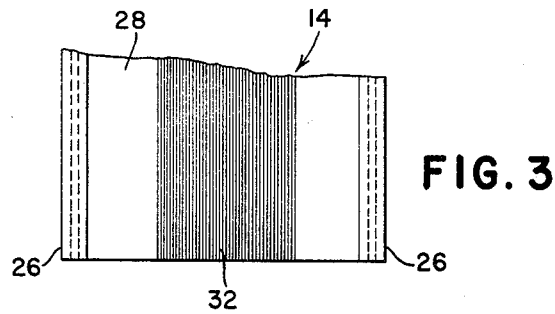
Figure 3 is a fragmentary plan of the strip at approximately actual size.

The strip is preferably of one-piece molded construction and the material is elastomer or its equivalent, such as a suitable plastic; for example, vinyl. The web is relatively thin, on the order of $\frac{1}{32}''$ in the example shown, so as to avoid materially increasing the thickness of the overlapped joint. The edge elements 26, being integral with the web, may thus be considered joined thereto and are here of the same material; although, manufacture in other fashions is not excluded, it being important only that these elements have the characteristics of resilience and distortability to accommodate irregularities in the nested corrugations and to yield to the compressive pressure previously referred to, particularly in cases in which this pressure may be relatively light. Each element is therefore tubular to exploit the aforementioned characteristic and, for reasons to be presently outlined, is cylindrical in cross-section, being thus thicker than the section of the web. In the example shown, each element has an outside diameter of 3/16" and an inside diameter of 1/16". These dimensions, like that of the transverse spacing between the elements, which is here on the order of 2" when the strip is curved to arcuate shape in the assembly, may be varied to suit conditions. The upper and lower surfaces of the web are of roughened character, as at 32, to minimize skidding of the strip during assembly. The roughened or non-skid characteristic is here achieved by longitudinal ribs or teeth which prevent transverse skidding. It will be clear that the entire zone represented by the dot-dash lines in Figure 2 includes the ribs or serrations (see Figure 3) and the width of this zone and the nature of the ribs, etc. are likewise variable, depending, for example, on the surface characteristics of particular panels and the coefficients of friction of the various materials. The anti-skid characteristic is normally beneficial along the peak and part way downhill at each side thereof.

Figure 4:
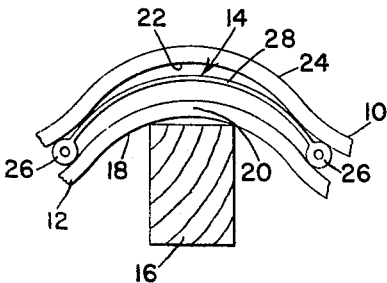
Figure 4 is an end elevation of a panel-to-panel assembly prior to completion.
Figure 5:
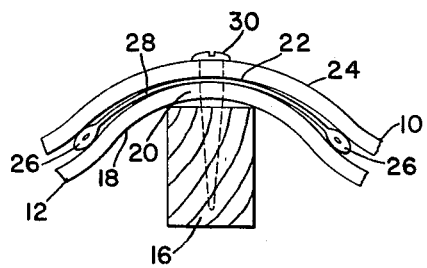
Figure 5 shows completion of the assembly begun in Figure 4.

After the panel 12 has been superimposed on the support 16, the strip 14, previously or subsequently cut to the proper length, is laid along the peak 20, preferably centralized therein; although, extreme accuracy is not required. Since the web or ribbon is flexible, it will conform to the shape of the peak and the elements 26 will lie downhill and respectively at opposite sides of the peak. The non-skid surface 32 on the web will retain the strip against displacement while the other panel 10 is laid in place, the corrugation 24 thereof nesting over the strip which in turn nests over the corrugation 18 of the lower panel 12. As the top panel is lightly seated (Figure 4) its under surface portions bordering the inverted valley 22 will rest on the tops of the elements 26, the bottoms of these elements resting as aforesaid on the slopes at opposite sides of the peak 20 of the corrugation 18. Now, as downward pressure is applied to the top panel along the zone of the nested peak and valley, as by the fastening means 30, this pressure will be largely confined to the zone directly above the support 16. Since the corrugations are flexible, they will have a tendency to "flatten" and the components of force exerted on the cylindrical elements 26 will cause the elements to roll downhill, theoretically equally, on the respective slopes at opposite sides of the peak 20. Thus these elements present opposite upper and lower rounder surfaces possessing the characteristics and permitting the results noted, and the elements therefore retain their sealing effect between the opposed surfaces of the nested corrugations. Even though the corrugations are not precise in shape and size, the flexibility and resilience of the elements 26 accommodate themselves to flexing, twisting, rolling and other deformation without losing sealing contact with the panel surfaces. Since the elements are tubular, their conformability to surface variations, such as pitting, etc. is remarkable. The foregoing is true whether the panels be of metal, plastic, asbestos-cement or otherwise, since all of these materials are yieldable to "flatten" as aforesaid and all possess surface defects to varying degrees. The rolling characteristic of the elements and their ability to retain sealing contact as related above are important when the panels shift and weave after final assembly or installation, which will occur because of settling of the building, because of winds where the structure is lightweight, and for other reasons.

Another important feature of the elements 26 is that they automatically afford a double seal; that is, they seal along two generally parallel zones, which is a result not normally attainable by caulking, since one zone is ordinarily inaccessible to the caulking gun. The improved seal endures indefinitely, because it is not affected by weathering, and since it retains sealing contact at all times, the panels in the vicinity of the strip are not subject to corrosion, rot or other deterioration peculiar to the particular material of the panels. Variations in pitch or height of the corrugations are, within appreciable limits, immaterial because of the adaptability of the strip to relatively wide tolerances. Of course, for predetermined maximum differences in sizes, etc., strips of conformable dimensions will be used.

Features and advantages other than those enumerated will readily occur to those versed in the art, as will modifications in the preferred structure disclosed, all of which are available within the spirit and scope of the invention.

What is claimed is:

1. A joint formed by overlapping marginal corrugations of a pair of corrugated panels forming part of a building structure in which the peak of the corrugation of one panel is nested within the overlapping adjacent corrugation of the other panel wherein a sealing strip is disposed between said overlapping portions providing an adjustable deflectable seal against entrance of air and moisture, said sealing strip comprising an elongated body of elastomer or like non-metallic resilient distortable material having a pair of transversely spaced parallel hollow marginal edge elements running lengthwise of the body and inter-connected by a central flexible web, said strip being disposed lengthwise between the nested corrugations with the said flexible web upon the peak of the crest of the underlying corrugation and the spacing between said edge elements being such that each edge element lies part way downhill from said peak, said web being relatively thin to avoid materially increasing the thickness of the joint along the nested peaks of the panel corrugations, each said edge element in an uncompressed state being thicker than the web and capable of deformation to accommodate irregularities in the spacing of the adjacent opposing downhill surfaces of the overlapped corrugations and to yield to pressure applied to the panel in the zone of the overlapped corrugations.

2. The joint as defined in claim 1, wherein said strip is symmetrical on opposite faces of the plane of the web and at opposite sides of a medial plane normal to the web.

3. The joint as defined in claim 1, wherein each edge element has opposite rounded panel contacting surfaces enabling each element to partake of limited uphill and downhill rolling upon the respective opposite slopes of the nesting corrugations.

4. The joint as defined in claim 3, wherein at least one surface of the web of the sealing strip is of roughened character to minimize skidding of the web relative to the panel as the elements roll upon the rounded slopes of the corrugations.

References Cited in the file of this patent

UNITED STATES PATENTS

| | | |
|---|---|---|
| 365,042 | Battelle | June 21, 1887 |
| 868,076 | Cross | Oct. 15, 1907 |
| 1,272,000 | Blackmore | July 9, 1918 |
| 1,412,556 | Earnshaw | Apr. 11, 1922 |
| 1,875,666 | Schwemlein | Sept. 6, 1932 |
| 2,717,514 | Meek | Sept. 13, 1955 |
| 2,718,677 | Cornell | Sept. 27, 1955 |